July 4, 1933.  C. C. BROWN  1,916,555
LIQUID FUEL CONSUMPTION INDICATOR
Filed Nov. 30, 1927  2 Sheets-Sheet 2
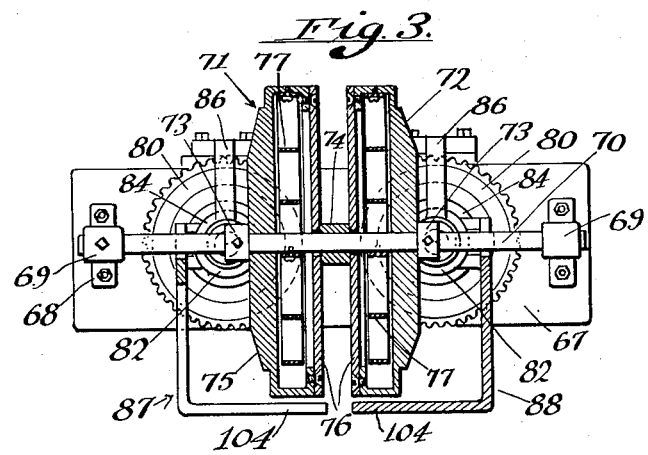
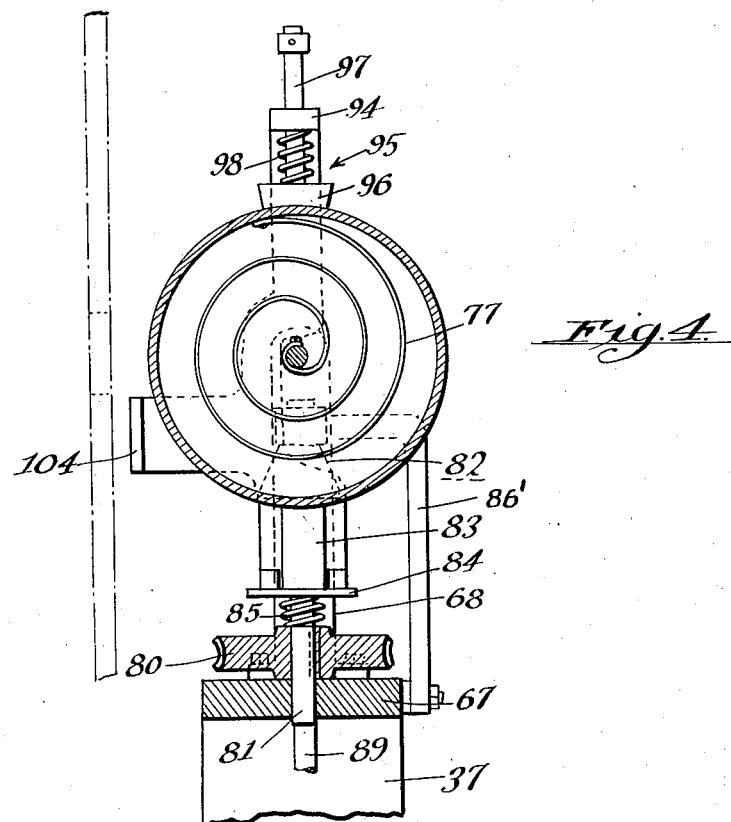
Inventor
Claude C. Brown
by Hazard and Miller
Attorneys Patented July 4, 1933

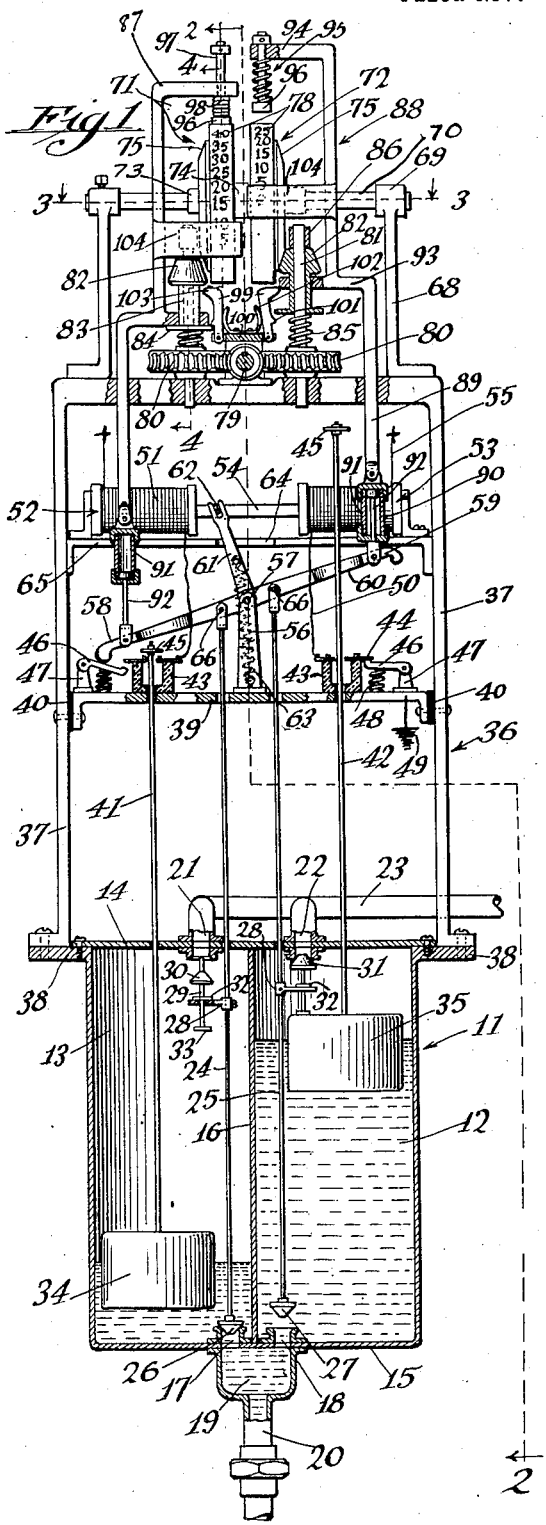
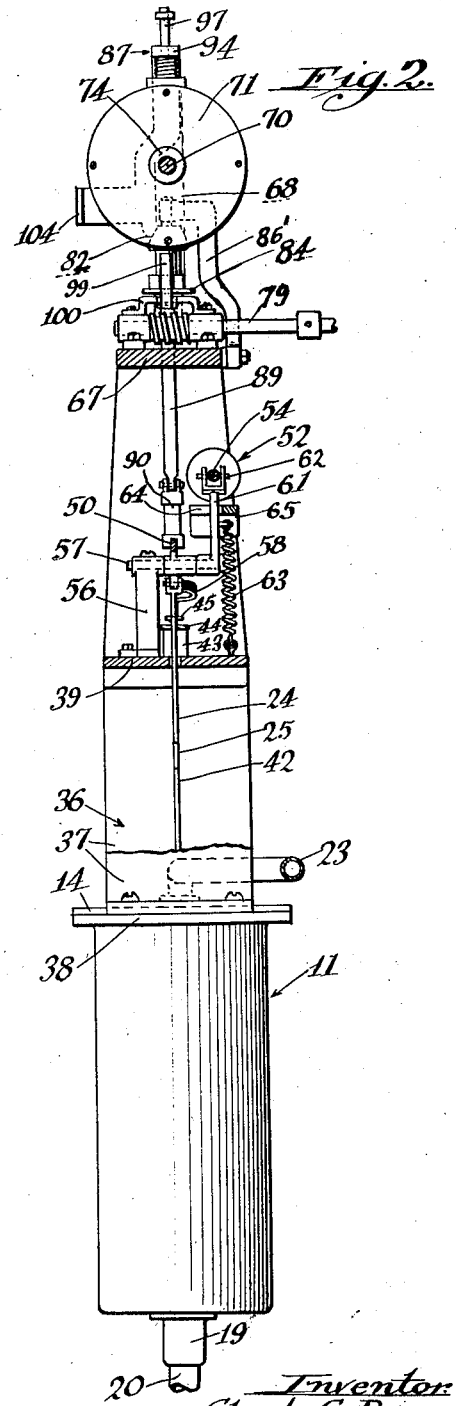

1,916,555

UNITED STATES PATENT OFFICE

CLAUDE C. BROWN, OF LOS ANGELES, CALIFORNIA

LIQUID FUEL CONSUMPTION INDICATOR

Application filed November 30, 1927. Serial No. 236,739.

My invention is in a liquid fuel consumption indicator. The present invention is adapted to indicate the rate of fuel consumption for vehicles of various kinds and is adapted to operate on unit quantities of fuel being utilized and to give an indication which will interpret this on the basis of either quantities of fuel used for units of distance traveled, or the calibration may be such as to indicate units of distance traveled per unit quantity of fuel. For instance, by the former calibration, the indicator may designate so many gallons or fraction of a gallon used per mile of travel, or so many liters or fractions of liters used per kilometer travel; and in the latter case the calibration may be such as to indicate the miles traveled per gallon of fuel or the kilometers of travel per liter of fuel.

An object of my invention is the construction of a device which may be operated in connection with a motor vehicle, giving the rate of consumption of fuel in relation to distance traveled, or it may be applied to an aeroplane and designate the consumption of fuel in regard to the air distance traveled or again the device may be utilized on vessels, giving the consumption of fuel in regard to the distance traveled on water.

In this present application I utilize a unit quantity of fuel to obtain an indication showing the economy of operation of the engine. In my copending application Serial No. 236,738, I operate the fuel devices on the basis of a unit distance of travel of a vehicle and obtain a registration showing the economy of operation of the vehicle.

It is obvious that the indicating mechanism may be connected to some part of a moving machine and indicate the consumption of fuel utilized in the operation of such machinery. This may represent a certain amount of work done, etc.; or the indicating device may be connected to a time actuating device and indicate the consumption of fuel in relation to time.

In the present application I utilize a plurality of liquid fuel receptacles, each having an inlet and an outlet controlled by valves and a float in each receptacle. Each float is connected preferably to an electro-mechanical device, establishing a circuit at the low level of the fuel and energizing an electromagnetic double throw device which will close one of the outlet valves and open the other and hold the valve of the receptacle discharging in its closed position, such latter valve having been closed by the rising float, due to the filling of the receptacle which has previously been emptied.

Connected to a moving part of a mechanism such as a device which indicates distance traveled by a vehicle over the ground, or the air travel of an aeroplane, or water travel of a boat, there are a plurality of indicating dials connected and disconnected for operation alternately by the double throw device which has been electrically controlled. Each of these dials is provided with a spring to return it to zero position after having been actuated by the moving shaft or the like connected to the distance measuring device. One of the dials is brought to rest and an indication given on the depletion or emptying of one of the receptacles and is held in this position while the other dial is rotating during the consumption of fuel out of the other receptacle. The dials are thus actuated and held stationary while the receptacles are being depleted and filled.

In accordance with the type of calibration above mentioned, the dials may indicate the quantity of fuel used per unit distance of travel or the distance traveled per unit of fuel, or any other type of calibration may be utilized which may be desired.

My invention will be more readily understood from the following description and drawings, in which:

Figure 1 is a front elevation partly broken away of my invention.

Fig. 2 may be considered a vertical section on the line 2—2 of Fig. 1 in the direction of the arrows, thus showing certain parts in elevation and other parts in section.

Fig. 3 is a detail horizontal section on the line 3—3 of Fig. 1 in the direction of the arrows through part of the indicating mechanism.

Fig. 4 is a detail vertical section on the line

4—4 of Fig. 1 in the direction of the arrows.

In the drawings I illustrate a tank, designated generally by the numeral 11, and having two receptacles 12 and 13 therein, this tank having a cover 14 and a bottom 15 with a partition 16 therethrough forming the two receptacles. There is an outlet 17 and 18 from each receptacle leading into a common sump 19 which has an outlet pipe 20 connected thereto. There are also inlets 21 and 22 drawing from a common inlet pipe 23. A pair of valve stems 24 and 25 have outlet valve plugs 26 and 27 connected to same and have adjustable arms 28 mounted on the stems. These arms have apertures therethrough and support valve stems 29, there being valve plugs 30 and 31 to close the inlet valves 21 and 22, respectively.

Each of the stems 29 has a collar 32 adapted to rest on the arm 28, and a head 33 adapted to be engaged by either of the floats 34 or 35. These floats in their upward movement elevate the valve stems 29 and thus close either of the inlets alternately, the action being described hereunder.

The electric controlling circuits and their manner of operation is substantially as follows:

A supporting frame designated generally by the numeral 36 has a pair of legs 37 illustrated as secured to a flange 38 of the tank 11 and supported on these legs there is a table 39 shown as having insulation 40 between the table and the legs. Float stems 41 and 42 are connected to the floats 34 and 35, respectively, and pass upwardly through apertures in the table 39; and also through apertures in insulating supports 43. These insulating supports have conducting plates 44 thereon, and on the upper end of each of the stems 41 and 42 there is a bridging piece 45 which is preferably electrically insulated from the float stems 41 and 42. There are a pair of contact triggers 46 pivotally mounted on brackets 47 and spring pressed upwardly by springs 48, these being adapted to contact with the contacts 44 and having an electrical connection 49 to ground.

Electric leads 50 connect to the windings 51 of the solenoids 52 and 53. These solenoids have a sliding armature 54 and a lead 55 is indicated from each of the windings leading to a grounded source of power.

A double throw mechanism and its electrical control is substantially as follows:

A standard 56 is mounted on the table 39 and has a shaft 57 mounted thereon. Oscillatably mounted on this shaft there is a double throw lever with two halves 58 and 59, these having openings 60 therethrough; also connected to the levers there is a toggle arm 61 which is connected to the armature 54 by a pin and slot connection 62. A toggle spring 63 is engaged between the toggle arm 61 and the table 39, thus giving the arm a quick throw when past the center. The arm 61 moves backwards and forwards through a slot 64 in a supporting plate 65 on which the solenoids are mounted.

Each of the valve stems 24 and 25 is pivotally connected to the double throw levers by a pivotal connection 66, these valve stems or rods passing through apertures in the table 39.

The mounting of the registering mechanism is substantially as follows:

The supporting frame 36 has a top or head 67 on which is supported a pair of standards 68 having hubs 69 therein and in these hubs there is mounted a transverse shaft 70 held against rotation by set screws or the like. On this shaft there are rotatably mounted a pair of dials 71 and 72, these being held in place by a side collar 73 and a center collar 74. Each of the dials has a friction surface 75 on the outside, a cover plate 76 on the inside and a coiled spring 77 connecting the dial to the shaft 70. The dials are also provided with indicia 78 on the periphery.

A main drive shaft 79 is mounted in suitable journals on the head 67 and drives a pair of gears 80, these being illustrated as a worm and worm wheel drive. Such gears are mounted on vertical stud shafts 81 journaled in the head 67. Each of these shafts has journaled thereon a friction gear 82. These gears have a reduced cylindrical section 83 and a flange 84 at the bottom, there being a compression spring 85 tensioned between the flange 84 and each of the gears 80. There is a stop collar 86 carried by a bracket 86' connected to the head 67 on the end of each shaft 81 limiting the movement of the slidable friction gear.

The stopping and starting mechanism for each of the dials includes the following features: A pair of slidable frames 87 and 88 have legs 89 sliding through apertures in the head 67 and the lower end of each of these is connected by a dash pot construction 90 to the double throw lever halves 58 and 59. This dash pot construction comprises a cylinder 91 pivotally connected to the lower end of each of the legs and a stem 92 having a piston thereon in the cylinder connected by a pivotal connection to one end of the double throw lever.

The upper ends of each of these frames 87 and 88 include an arm 93 having an opening therethrough fitting on the cylindrical part 83 of the friction gear 82, allowing a sliding motion of one relative to the other. The upper ends 94 of each of these frames has a brake 95 connected thereto, this brake being illustrated as having a brake shoe 96 mounted on a stem 97 and pressed downwardly by a coiled spring 98 wound on the stem and pressing downwardly on the brake shoe from the top 94.

A pair of latches 99 are pivotally connected to a bar 100 above the shaft 79 and each of these latches has a dog 101 to engage on the flange 84. These latches are outwardly pressed by springs 102.

The upper part of the latches has a toe 103 to be engaged by the arms 93 in the upward movement of each of the frames 87 and 88. Each of the frames has a cover strip 104 which is positioned to cover the numerals on the dials while such dials are indicating, and to expose the numerals when the dials are held stationary in position for observation. It is desirable to mount the device behind a panel and have apertures through the panel, through which the dials will be visible, the cover strips alternately opening and closing said apertures.

The manner of operation and functioning of my fuel consumption indicator is substantially as follows:

Each of the receptacles 12 and 13 is made of a size dependent on the type of engine or boiler, etc., to which it is connected, and between the high level shown in receptacle 12 and the outlet, these are designed to hold unit quantities of fuel. Presuming the device is in the position illustrated in Fig. 1, the fuel is being discharged from receptacle 12 and leads to an engine or to a boiler, or the like. At the same time, the inlet 21 of the receptacle 13 being open, this receptacle is being filled and the device is designed so that the receptacles fill much faster than they discharge.

As the float 35 moves downwardly, drawing the stem 42 with it, when the fuel is at its low level the bridging piece 45 makes a contact with the conducting plates 44. This allows a current to pass from the source of power through the lead 55 to the winding of the solenoid 53; this being energized moves the armature 54 from the position illustrated, into the energized solenoid. This action rocks the arm 61 interconnected with the armature 54 by the pin and slot connection 62 and such action rocks the double throw lever halves 58 and 59 from the inclined position illustrated to the opposite inclined position. In such action the knob on the lower end of the double throw lever engages one of the contact triggers 46 shown engaging the conducting plate 44, and thrusts this downwardly, thereby breaking the circuit to the lead 49 and hence to the ground. It will thus be seen that the solenoid energized is only energized for a short time. The toggle spring 63 gives a quick action to the double throw lever when it has passed its pivotal center.

Before the receptacle 12 is empty the float 34 has risen in the receptacle 13, and thrusting upwardly on the head 33 of the valve stem 29, has closed the inlet 21 by the valve plug 30. The action of reversing the position of the double throw levers shifts the valve stems 24 and 25, closing the outlet to the receptacle 12 and opening the outlet from the receptacle 13; and, at the same time, has shifted the adjustable arm 28 on the stem 25 downwardly so that the valve plug 31 may be lowered and hence the inlet 22 is opened for refilling the receptacle 12. It will be noted that the arms 28 allow sliding movement of the stems 29 so that the valve plugs 30 and 31 may be thrust outwardly by the rising of the floats 34 and 35 prior to the shifting of the double throw levers 58 and 59.

In the position of the indicating mechanism as shown in Fig. 1, the frame 88 is shown in its upper position, being supported on the high end 59 of the double throw lever, and in such position the arm 93 has elevated the friction gear 82 into engagement with the friction surface 75 of the dial 72; hence this dial is being rotated due to the constant rotation of the main drive shaft 79, that is, this dial is rotating while the receptacle 12 is discharging.

Also, in the position indicated, the dial 71 is not driven, as the frame 87 is in its lowermost position and the friction gear 82 slidable through the arm 93 on such frame has moved downwardly, the spring 85 being compressed. In this position the latch dog 101 engages the flange 84 and positively prevents upward movement of the friction gear 82 on this side of the device until its proper time of movement, as described hereunder.

When the frames 87 and 88 are in their lowermost position, the cover strip 104, being lowered, exposes the indicia numeral on the non-driven dial which is facing the front of the machine.

Besides disengaging the driving device from the dials, these are brought to a positive stop by means of the brake shoes 96, as the upper ends 94 of these frames, when in the lowermost position, compress the coiled springs 98, thereby thrusting the brake shoes into engagement with the peripheral surface of the dials.

Reverting to the action, when the double throw lever changes from the position illustrated in Fig. 1 to the opposite inclined direction, this action lowers the frame 88 and, as above mentioned, applies the brake to the dial 72, and forces the friction gear 82, which has been driving this dial, out of engagement therewith, latching it by the latch dog 101. At the same time the frame 87 has been elevated and the arm 93 strikes the toe 103 of the latch 99 on the left-hand side, it forces this outwardly by compressing the spring 102, releasing the flange 84 and allowing the friction gear 82 to be thrust upwardly by the spring 85 so as to drive the dial 71, the dial 72 now being stationary and having its indicia exposed.

From the above description it will be seen that while each receptacle is discharging a unit quantity of fuel, the dials 71 and 72 alternately are being positively driven by the main drive shaft 79 which it is presumed is connected to some part of a vehicle indicating its movement of translation. Therefore, by proper calibration of the dials these can be made to read in so many units of distance per a single unit of fuel, as so many miles per gallon of fuel, or kilometers to the liter of fuel. Or again, if desired the calibration could be such as to indicate the quantity of fuel used per unit distance of travel, as the number of gallons or fractions thereof per mile of travel or liters per kilometer of travel.

Although there is no continuous indication being exhibited and the indication which is exhibited for observation is stationary, by making the units of fuel sufficiently small the device may be caused to shift at quite frequent intervals and thereby for all practical purposes give a sufficiently accurate indication of the rate of consumption of fuel.

It is to be observed that in my device it is not necessary that the fuel be depleted from the high level to the actual outlet, as the quality of fuel consumed in each depletion of a receptacle is governed by the movement of the float from its high level to its low level where it establishes the electric circuit, and by adjusting the bridging piece 45 on the float stems 41 and 42 the unit quantities of fuel consumed on the depletion of each receptacle may be accurately gauged.

From the above description together with the illustrations it will be clear that I have developed a method of indicating fuel consumption in which a unit quantity of fuel is caused to flow to a consuming device, and an indicator operated by a moving part of a machine is caused to give an indication of the quantity of fuel used in relation to the movement of such mechanism; and presuming this is a vehicle having movement of translation, the consumption of a unit quantity of fuel by means of the indicator may designate the rate of consumption on the basis of distance per unit of fuel consumed, or the calibration may be such as to indicate the quantity of fuel used per unit of distance.

My method may be described in connection with a vehicle as flowing designated units of fuel alternately to a consuming device, and alternately operating indicators driven by a part of a mechanism of the vehicle registering distance, and when one quantity of fuel is depleted, a part of the indicator is held stationary to give the desired indication, and at the same time the other element of the indicator is undergoing a movement which, when the other quantity of fuel is depleted, indicates the rate at which such fuel has been consumed.

Various changes may be made in the principles of my invention without departing from the spirit thereof, as set forth in the description, drawings and claims.

I claim:

1. A liquid fuel indicator comprising in combination means to flow unit quantities of fuel alternately from two tanks to a consuming device by a common means, a plurality of indicators, means to drive each indicator alternately from a power device connected to moving machinery, means to stop one indicator to give an indication of the rate of consumption of fuel, and means to actuate the other indicator while one quantity of fuel is flowing to the consuming device.

2. A liquid fuel consumption indicator comprising in combination a plurality of receptacles for receiving and flowing fuel by a common means to a consuming device, a plurality of indicators, means to drive each indicator alternately from a common moving element connected to moving machinery, means on the depletion of fuel in one of the receptacles to stop one of the indicators and connect the other indicator for movement, thereby giving indication of the rate of consumption of fuel on the indicator held stationary, the other indicator operating while the other receptacle is discharging.

3. A liquid fuel consumption indicator comprising in combination a plurality of receptacles, each having an inlet and an outlet, a common connection from such outlets valves having means to close each outlet alternately, a float in each receptacle, means actuated by each float to close the inlet valves on filling of each receptacle alternately, an indicator mechanism connected for driving from a moving element of a machine, and means interconnecting said indicator with the outlet valves to give an indication of the rate of consumption of fuel from each receptacle alternately.

4. A liquid fuel consumption indicator comprising in combination a plurality of receptacles, each having an inlet and an outlet and an outlet valve with a valve stem, a float in each receptacle, an inlet valve for each inlet adapted to be closed on the rising movment of each float alternately and having means to retain same closed while the outlet valve of said receptacle is open, an electro-mechanical means interconnected with each float to shift the valve stems on depletion of the receptacle, an indicating device interconnected for driving from a moving part of a machine, and means interconnecting each outlet valve with said indicator to indicate the rate of consumption of fuel in depletion of a receptacle.

5. A liquid fuel consumption indicator, as claimed in claim 4, the indicator having a plurality of dials driven alternately, one dial being held stationary while the receptacle to which it is connected is filling and the other dial operating while the receptacle to which it is connected is being depleted.

6. A liquid fuel consumption indicator having a plurality of tanks, a plurality of rotatable dials, a drive mechanism operated by moving machinery, means to alternately drive and hold stationary each dial, means to flow fuel from a tank to a consuming device while each dial is operating, the stationary dial giving an indication of the rate of consumption of fuel while such dial was operating and means to fill another tank while a tank is discharging.

7. A liquid fuel consumption indicator having a plurality of rotatable dials, a drive mechanism operated by moving machinery, means to alternately drive and hold stationary each dial, a plurality of liquid fuel receptacles having means to fill each receptacle alternately and to deplete one receptacle while the other is being filled, and means to operate one of the dials while a receptacle is being depleted, the other dial being held stationary and giving an indication of the rate of consumption of fuel while the receptacle to which it is connected is being depleted.

8. A liquid fuel consumption indicator comprising in combination a plurality of receptacles, means to fill and deplete said receptacles alternately, each receptacle discharging a unit quantity of fuel, an indicator having a plurality of moving devices adapted to be driven alternately from moving machinery, each of said devices being interconnected with a receptacle, an indicating device being held stationary after the receptacle to which it is connected is depleted and while such receptacle is filling and giving an indication of the rate of consumption of fuel during the depletion of such receptacle, another device connected to a receptacle being depleted accumulating an indication to show the rate of consumption of fuel after such latter receptacle is depleted.

9. A liquid fuel consumption indicator comprising in combination a plurality of receptacles, each having an inlet and an outlet, a float in each receptacle, an electrical circuit operated by each float on the depletion of a receptacle, electro-mechanical means controlled by said circuit to close an outlet on depletion of a receptacle and open the outlet of another receptacle, means to close the inlets to each receptacle on the filling of such receptacle, an indicating device driven by moving machinery, and means to interconnect said device with the electro-mechanical controlled means to indicate the rate of consumption of fuel in the depletion of a receptacle.

10. A liquid fuel consumption indicator comprising in combination a plurality of receptacles, each having an inlet and an outlet, a float in each receptacle, a double throw lever, outlet valve means for each receptacle connected to said lever, electric circuits, means to actuate said circuits by each float on depletion of a receptacle, electro-mechanical means to rock said lever through the medium of an operative electric circuit and cause said lever to close one outlet and open the other, an indicating mechanism having a plurality of moving indicating devices, a power drive from moving machinery, means actuated by said lever to alternately move each of the indicating devices from said power drive and to hold the other device stationary, the stationary device being connected to a receptacle which has been depleted and the moving device being connected to a receptacle undergoing depletion.

11. A liquid fuel indicator having an indicator device comprising a pair of dials, a power shaft driven by a moving mechanism, a pair of shiftable driving gears driven from said power shaft, one for each dial, a brake for each dial, a pair of liquid fuel receptacles having means for in and out flow of fuel, means actuated on the depletion of the fuel in one receptacle to release the driving gear from one of the dials and to apply the brake to such dial, and at the same time close the outlet of the depleted receptacle and open the outlet of the other receptacle and at the instant of opening the outlet of the other receptacle, connecting the driving gear to the second dial and removing the brake therefrom.

12. A liquid fuel indicator, as claimed in claim 11, a latching means to positively hold each driving gear alternately disconnected from its dial, and a shiftable frame interconnected with the shifting mechanism for the outlet valves to alternately release such latches.

13. In a liquid fuel indicator having a plurality of receptacles with inlets and outlets and a float in each receptacle, an electrical make and break circuit operatively connected to each float, a double throw lever, an electric device operatively connected to each circuit to shift said lever on closing the circuit on movement of a float, said double throw lever actuating a contact trigger in the circuit to break such circuit, and an indicating device operatively connected to the double throw lever and to a drive from a moving mechanism to indicate the rate of consumption of fuel.

14. A liquid fuel consumption indicator comprising in combination means to alternately flow unit quantities of fuel through a plurality of valves to a consuming device, a plurality of indicators each disconnectibly driven from a power device, an electro-mechanically operated control to start and stop said indicators, said control being operatively connected with the said valves.

15. A liquid fuel consumption indicator comprising in combination a plurality of receptacles with discharge valves therefor, and floats in said receptacles to control the flow of unit quantities of fuel, a plurality of indicators each being disconnectibly driven from a power device and means interconnected between the floats and the valves to control the alternating stopping and starting of said indicators.

16. A liquid fuel consumption indicator comprising in combination a plurality of receptacles each having an inlet and an outlet valve for liquid fuel, a float in each receptacle, an electro-magnetic device controlled by each float, means operated by the electro-magnetic device to actuate the inlet and outlet valves, a plurality of indicators each disconnectively driven by a power device, and means controlled by the electro-magnetic device to actuate the starting and stopping of each of said indicators.

In testimony whereof I have signed my name to this specification.

CLAUDE C. BROWN.